No. 809,815. PATENTED JAN. 9, 1906.
H. KOORIE.
CLOTHES LINE PULLEY.
APPLICATION FILED MAR. 31, 1905.
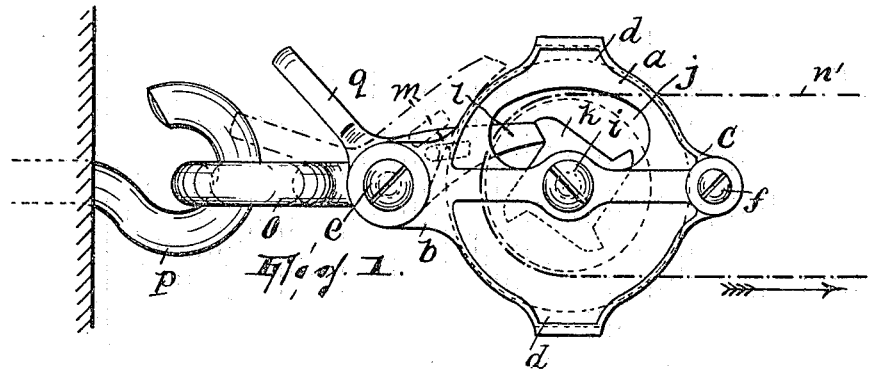
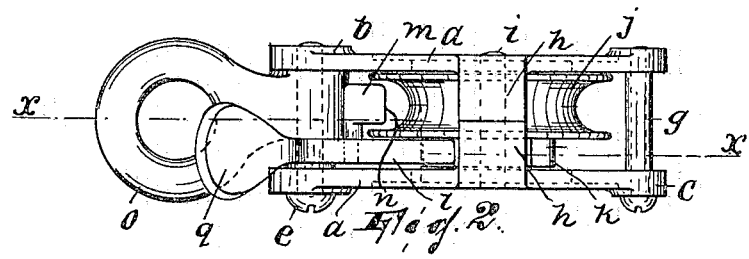
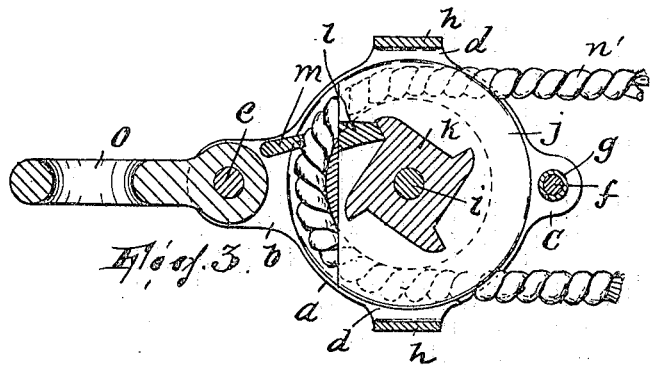
WITNESSES: Wm. D. Bell
Adele Glatt.
INVENTOR,
Hamas Koorie,
BY
Gartner & Seward,
ATTORNEYS.

UNITED STATES PATENT OFFICE.

HANNA KOORIE, OF PATERSON, NEW JERSEY.

CLOTHES-LINE PULLEY.

No. 809,815.     Specification of Letters Patent.     Patented Jan. 9, 1906.

Application filed March 31, 1905. Serial No. 253,106.

*To all whom it may concern:*

Be it known that I, HANNA KOORIE, a citizen of the United States, residing in Paterson, in the county of Passaic and State of New Jersey, have invented certain new and useful Improvements in Clothes-Line Pulleys; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to clothes-line pulleys, and has for its object to provide a device of this nature with means for preventing at will the pulley proper from rotating except in one direction and the rope from slipping on the pulley under the weight of the clothes.

The use of the ordinary clothes-line pulley where the pulley proper is free to rotate in either direction is accompanied with no little inconvenience, not to say some element of danger, in that in drawing in the line weighted down by the clothes or garments attached thereto there is no means for securing the line against a reverse movement each time a pull toward the operator is exerted on the line.

I have accomplished the foregoing object in a simple, practical, and inexpensive way, as will be seen from the following description in the light of the accompanying drawings, in which latter the pulley is seen in Figure 1 in side elevation, in Fig. 2 in plan, and in Fig. 3 in section, the section being taken on the line $x\, x$ in Fig. 2.

The pulley-block comprises two plates $a$ of substantially circular form, having radial corresponding projections $b\, c$ and $d\, d$, the projections $b$ and $c$ of the two plates being penetrated by screws $e$ and $f$. A sleeve $g$ on screw $f$, arranged between projections $c$, and lugs $h$, formed integrally with projections $d$ and abutting against each other when the parts are assembled, space the plates $a\, a$.

$i$ is a screw which forms a spindle or bearing for the pulley $j$, said screw being mounted centrally in the plates $a$. On one face of the pulley is a ratchet $k$.

$l$ is a pawl which is pivoted on screw $e$ and is arranged to engage the ratchet $k$. On the side of said pawl adjacent the pulley is a rigid dog $m$, whose edge $n$ when the pawl is engaged by the ratchet projects somewhat into the groove of the pulley. Thus while the pulley is held by the pawl from turning under the pull of the rope $n'$ in the direction of the arrow in Fig. 1 the rope is also held from slipping in the same direction by the dog $m$; but the rope may be freely pulled in the opposite direction, so as to draw in the clothes.

$o$ is the usual eyelet pivoted on screw $e$ for attaching the device to a hook or the like $p$.

$q$ is a thumb-piece forming a part of pawl $l$ and so projecting over eyelet $o$ that it acts to limit the movement of the pawl when thrown back.

Having thus fully described my invention, what I claim as new, and desire to secure by Letters Patent, is—

The combination, in a clothes-line pulley, of the pulley-block, the pulley proper journaled therein, a pawl-and-ratchet connection between the pulley-block and the pulley proper, and a rope-holding dog carried by the pawl and projecting into proximity to the perimeter of the pulley, substantially as described.

In testimony that I claim the foregoing I have hereunto set my hand this 13th day of November, 1903.

HANNA KOORIE.

Witnesses:
   JOHN W. STEWARD,
   JACOB TURFANGY.